United States Patent [15] 3,645,625
Leistner [45] Feb. 29, 1972

[54] TEST DEVICE FOR AN IMAGE MOTION COMPENSATION AERIAL CAMERA

[72] Inventor: Karl Leistner, RFD 1, P.O. Box 117, Eatontown, N.J. 07724

[22] Filed: Dec. 22, 1970

[21] Appl. No.: 100,739

[52] U.S. Cl.....................356/27, 95/12.5, 356/28, 356/256
[51] Int. Cl.........................................G01p 21/00
[58] Field of Search...............356/3, 27, 28, 256; 95/12.5

[56] References Cited

FOREIGN PATENTS OR APPLICATIONS 609,392  9/1960  Italy.........................356/27

Primary Examiner—Ronald L. Wibert
Assistant Examiner—F. L. Evans
Attorney—Harry M. Saragovitz, Edward J. Kelly, Herbert Berl and Jeremiah G. Murray

[57] ABSTRACT

The device for calibrating an image motion compensation aerial camera includes a pair of transparent scales formed on an enclosure having two light tight compartments, one for each scale. Each compartment contains a flash lamp which is energized at specifically spaced intervals determined by a one-shot multivibrator. During a test, the camera photographs a superposition of the two scales while the film is in motion. The amount of displacement between the photographed scales will indicate the velocity of the film.

7 Claims, 4 Drawing Figures

PATENTED FEB 29 1972    3,645,625

INVENTOR.
KARL LEISTNER
BY: Jeremiah G. Murray
Harry M. Saragovitz,    AGENT
Edward J. Kelly &
Herbert Berl    ATTORNEYS

TEST DEVICE FOR AN IMAGE MOTION COMPENSATION AERIAL CAMERA

The present invention relates to a test device and more particularly to a device for measuring motion, such as the film motion in cameras containing image motion compensation equipment.

Since aerial cameras are moving during exposure with respect to the object (terrain), image blurs will occur at all but the very shortest exposure times. To avoid this, most aerial cameras are equipped with image motion compensation (IMC) mechanisms, whereby the film is moved during exposure in the same direction and at the same speed at which the optical image of the terrain moves in the focal plane, thus making film and image stationary with respect to each other.

The rate of IMC is controlled either by manually setting a dial or automatically from a sensor which measures the ratio of aircraft velocity to its altitude above ground, a ratio to which the IMC rate must be proportional to be effective.

A test procedure must be available to ascertain the film speed in the camera for calibrating the dial or adjusting the automatic mechanism. Some prior art test equipments simulate the in-flight picture-taking process by providing a moving target, usually resolving power charts, that can be moved at different controlled speeds. Because aerial cameras are usually focused for infinity, this target must be part of a collimator arrangement. If the ratio of target motion to collimator focal length equals the ratio of IMC film motion to camera focal length, the image resolution on the film is the same as that obtained with stationary target and stationary film. Such a test procedure has disadvantages in that many calibrations of components must be made. Also, only a yes or no answer is provided and there is no means of accurately knowing what the IMC rate was, if the test image does not have the same resolution as the stationary comparison image.

It is an object of the present invention to provide a test device which is relatively simple and has no parts which must move during a test.

Another object of the invention is to provide an IMC test device which requires only one calibration made simultaneously with the test exposure and provides the actual IMC rate that was effective at the time of exposure.

With these and other objects in view, as will hereinafter more fully appear, and which will be more particularly pointed out in the appended claims, reference is now made to the following description taken in connection with the accompanying drawings in which:

Figure 1:
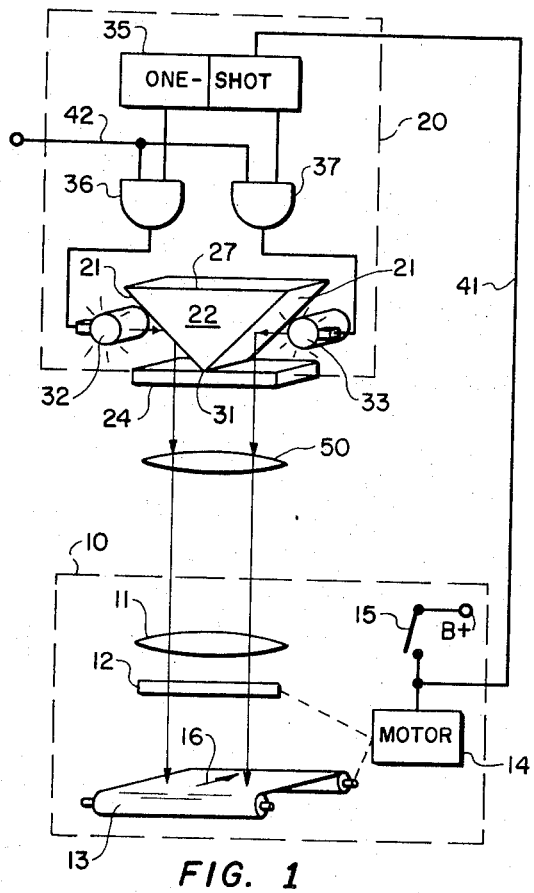
FIG. 1 is a schematic representation of a preferred embodiment of the invention.

Referring now to the drawings, wherein like reference characters designate like or corresponding parts throughout the several views, there is shown in FIG. 1 a diagrammatic illustration of the principle parts of an IMC aerial camera 10 having a lens 11, a shutter 12, a roll of film 13, a motor 14, a switch 15 and a battery $B^+$. Because a more detailed description would be extremely complex and since such cameras are standard, only the principle parts are shown here in diagrammatic form.

A picture is taken when the photographer closes the switch 15, thereby releasing the shutter 12, via motor 14, and exposing the film 13 to an image formed by lens 11. In order to effect IMC the motor 14 moves the film 13 during exposure in the direction of the arrow 16. The controls for the motor 14, which would adjust the shutter speed and the direction and speed of IMC, are not shown for simplicity. It is, of course, understood that the camera 10 is to represent any standard IMC aerial camera.

Figure 2:
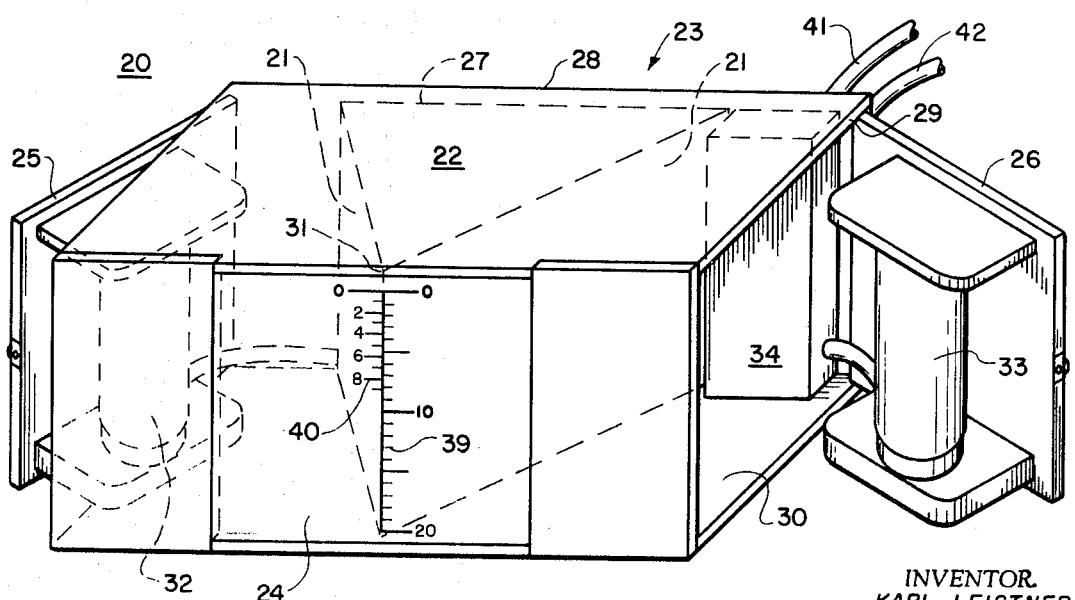
FIG. 2 is a perspective view of a preferred embodiment of the invention.

The test device 20, which is shown in detail in FIG. 2 and diagrammatically in FIG. 1, includes reflectors 21 formed on a glass prism 22 mounted in an enclosure 23 having a screen 24 and access doors 25 and 26. The prism 22 is mounted such that the base 27 is flush with the back wall 28, the end faces are flush with the upper and lower walls 29 and 30, and the apex 31 is flush with the screen 24, thereby, forming two lighttight compartments.

The screen 24 may be formed of glass, or other transparent material, coated with an opaque material. Lines are then etched on screen 24 to form transparent scales 39 and 40 on opposite sides of the line formed by apex 31. Of course, screen 24 might also be formed of an opaque material having slits cut therein to form scales 39 and 40.

Mounted on doors 25 and 26 are flash lamps 32 and 33 respectively. Also mounted in enclosure 23 is an electronic package 34 which includes a one-shot multivibrator 35 and a pair of transmission gates 36 and 37 having one of the inputs thereof connected to complementary outputs of the one-shot 35. The outputs of gates 36 and 37 are connected to flash lamps 32 and 33 respectively. A second input lead 41, which is connected to the input of one-shot 35, is provided for connection to the battery $B^+$ via switch 15 in camera 10.

Figures 3, 4:
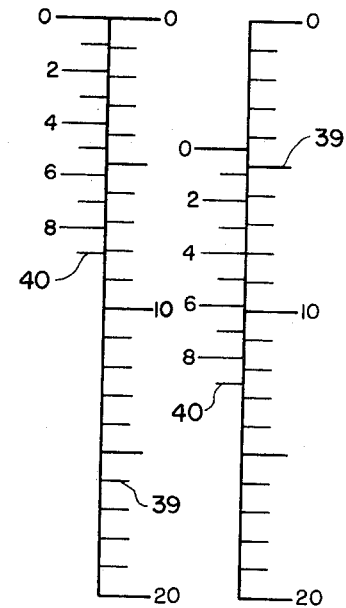
FIG. 3 is a plan view of a portion of the device shown in FIG. 2.
FIG. 4 is a plan view of a test exposure.

FIG. 3 shows the scales 39 and 40 as they appear on the face of the screen 24. Scale 39 is the main scale and scale 40 is a vernier-type scale. The uppermost graduation on scales 39 and 40 are colinear and are each marked with a zero (0). The graduations on the vernier type scale 40 are spaced a distance which is nine-tenths the distance between the graduations on the scale 39.

FIG. 4 represents the scales 39 and 40 as they would appear on a test exposure taken by camera 10. FIG. 1 shows a test setup, the operation of which will now be described. The camera 10 to be tested is focused at infinity and directed at the scales 39 and 40. A collimator device, represented by lens 50, is placed between the camera 10 and the scales 39 and 40 and focused so that the scales 39 and 40 will appear to the camera 10 to be coming from infinity. The lead 41 is connected to the camera 10, as shown in FIG. 1, and the lead 42 is connected to a source of power capable of energizing lamps 32 and 33. The device 20, of course, may be designed such that the lead 42 can be plugged into any standard 115-volt outlet.

The camera 10 is now ready to be tested. A particular IMC rate is set on the camera 10 by adjusting the appropriate dials thereon and the switch 15 is then closed. Upon closing the switch 15, the motor 14 moves the film 13 in the direction of the arrow 16 at a rate determined by the IMC rate and also opens shutter 12 for a predetermined exposure time while the film 13 is moving. The one-shot 35, which is normally in a stable state, is then forced into its unstable state from which it returns to the normally stable state after a predetermined time interval which should be shorter than the camera exposure time. The transition from the stable state to the unstable state is detected by gate 37, which transmits from line 42 a sufficient amount of power to energize lamp 33. When lamp 33 is energized, light passes through scale 39, is collimated by collimator 15, and an image of the scale 39 is focused by lens 11 onto film 13. When the one-shot 35 returns to the stable state, the transition opens gate 36 causing lamp 32 to be energized. The light from lamp 32 passes through scale 40, collimator 15 and into camera 10 which now images scale 40 on film 13. However, because film 13 has moved some distance during the time interval between energization of the lamps 32 and 33, the superposition of scales 39 and 40 as photographed by film 13 appear displaced and the zero graduations will not appear colinear. The amount of displacement will be a function of the distance the film moved and the period of the multivibrator. Because of this, the scales 39 and 40 may be directly calibrated in IMC rate and the actual IMC rate may be read directly from the test photograph. For example, the test photograph of FIG. 4 could represent an IMC rate of 4.4 inches per second.

Obviously many modifications and variation of the present invention are possible in the light of the above teachings. It is therefore to be understood that within the scope of the appended claims, the invention may be practiced otherwise than as specifically described.

What is claimed is:

1. A test device for use in measuring motion comprising a screen; a transparent main scale having a series of regularly spaced graduations formed on said screen; a transparent index scale formed on said screen in juxtaposition to said main scale; illumination means for passing light selectively through said scales upon energization of said illumination means; and timing means for energizing said illumination means such that light passes first through one of said scales and then through the other of said scales after a predetermined time delay.

2. The device according to claim 1 and wherein said index scale is a vernier-type scale having a series of graduations regularly spaced a distance which is different from the spacing of said graduation on said main scale.

3. The device according to claim 1 and wherein said illumination means includes two flash lamps each mounted in a different compartment; each said compartments having a different one of said scales forming a part thereof and being lighttight except for said scales.

4. The device according to claim 3 and wherein said index scale is a vernier-type scale having a series of graduations regularly spaced a distance which is different than the spacing of said graduations on said main scale.

5. The device according to claim 4 and wherein said timing means includes a pair of two input transmission gates and a monostable multivibrator having dual outputs connected to one of said two inputs of a different one of said transmission gates; the other of said inputs having means for connection to a source of power; the outputs of said gates being connected to a different one of said flash lamps, whereby said power is transmitted to said flash lamps via said gates when said multivibrator switches between the states thereof.

6. A test device comprising an opaque enclosure forming first and second compartments separated by an opaque partition; a main scale having regularly spaced transparent graduations formed on the walls of one of said compartments; a transparent index scale formed on the walls of the other of said compartments; said main scale and said index scale being in juxtaposition; illuminating means mounted in each said compartment for passing light selectively through said scales; and timing means for energizing said illuminating means for passing light through said scales at predetermined time intervals.

7. The device according to claim 6 and wherein said illuminating means includes a pair of flash lamps each mounted in a different one of said compartments; and said timing means includes a pair of two input transmission gates and a monostable multivibrator having dual outputs connected to one of the inputs of a different one of said transmission gates, the other of said inputs having means for connection to a source of power, the outputs of said gates being connected to a different one of said flash lamps, whereby said power is transmitted to said flash lamps via said gates when said multivibrator switches between the states thereof.

* * * * *